Figure 1:
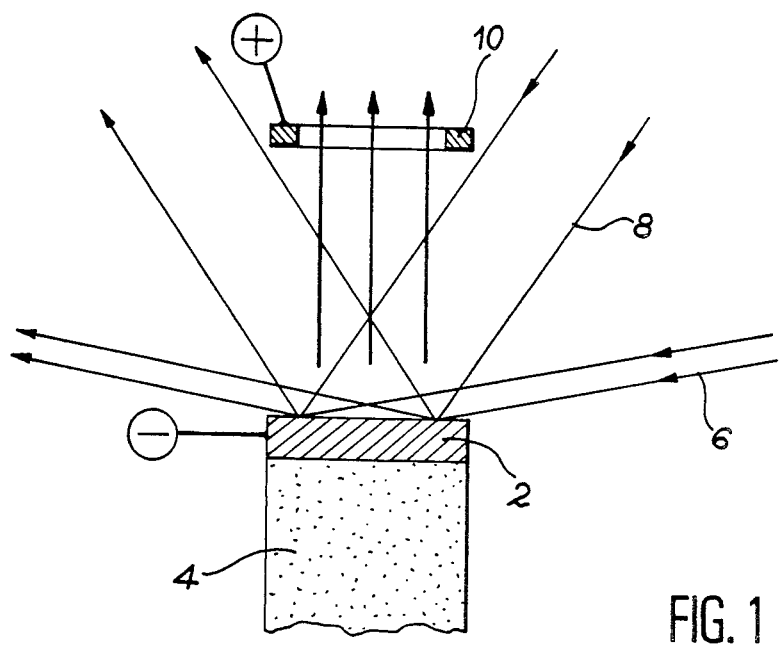

United States Patent [19]

Girardeau-Montaut et al.

[11] Patent Number: 4,845,365
[45] Date of Patent: Jul. 4, 1989

[54] PROCESS AND APPARATUS FOR PRODUCING ELECTRONS USING A FIELD COUPLING AND THE PHOTOELECTRIC EFFECT

[75] Inventors: Jean-Pierre Girardeau-Montaut; Claire Girardeau-Montaut, both of Lyons; Angelo Erbeia, Annemasse, France

[73] Assignee: Commissariat A L'Energie Atomique, Paris, France

[21] Appl. No.: 211,388

[22] Filed: Jun. 24, 1988

[30] Foreign Application Priority Data

Jun. 25, 1987 [FR] France ................................ 87 08946

[51] Int. Cl.$^4$ ............................................. H01J 27/24
[52] U.S. Cl. ................................ 250/423 P; 250/424; 313/542
[58] Field of Search ............... 250/423 P, 423 R, 424; 313/542

[56] References Cited

FOREIGN PATENT DOCUMENTS 3038405  4/1981  Fed. Rep. of Germany .

OTHER PUBLICATIONS

Article by M. Wautelet et al. published in Phys. Rev. Letters, vol. 38, No. 1, Jan. 1977, pp. 40–43.
Article by F. Shishito published in Japanese Journal of Appl. Physics, vol. 12, No. 7, Jul. 1973, pp. 1001–1010.
Article by P. Oettinger published in Laser Focus, Jul. 1983, pp. 10–14.

Primary Examiner—Jack I. Berman

[57] ABSTRACT

According to the invention, under glancing incidence a first radiation (6) in the infrared range and which is linearly polarized is supplied to a target (2) made from a non-electrically insulating material and simultaneously to said target is supplied under a non-glancing incidence a second radiation (8) in the visible or ultraviolet range, in such a way that a same zone of the target is reached by the first and second radiations, the polarizing plane of the first radiation also being such that it contains a perpendicular to said zone, which then produces electrons.

Application to the production of free electron lasers.

11 Claims, 3 Drawing Sheets

PROCESS AND APPARATUS FOR PRODUCING ELECTRONS USING A FIELD COUPLING AND THE PHOTOELECTRIC EFFECT

DESCRIPTION

The present invention relates to a process and an apparatus for producing or generating electrons using a field coupling and the photoelectric effect.

It is used in all fields, where there is a need for high density electron currents and more particularly applies to the production of electron sources for certain particle accelerators, free electron lasers, certain gas lasers (e.g. of the excimer type) and high power, high frequency tubes of the KLYSTRON or LASERTRON type.

Various methods for producing electrons are already known. They respectively use the thermoionic effect, the photoelectric effect and the field effect. However, none of these known methods is appropriate for the production of very high density electron currents in the form of very short duration, high frequency pulses.

The present invention aims at obviating this disadvantage.

It firstly relates to a process for the production of electrons, characterized in that it comprises supplying under a glancing incidence of a first radiation of the near or far infrared range which is linearly polarized to a target made from not electrically insulating material and simultaneously supplying to said target under a non-glancing incidence a second radition of the visible or ultraviolet range, in such a way that the same zone of the target is reached by the first and second radiations, the polarizing plane of the first radiation also being such that it contains a perpendicular to said zone, said zone then producing electrons.

The term "electrically non-insulating material" means either an electrically conductive material, such as a metallic material (pure metal or metal alloy), or a semiconductor material.

The target can be in the form of a solid part, in which case the word "zone" designates a surface portion of said target, or in the form of a thin film with a thickness of approximately 100 nanometers to 1 micrometer and which is formed on a substrate (whereby the latter can be opqaue or transparent to the second radiation), in which case the word "zone" designates a volume portion of the target. The latter is obviously sufficiently planar, at least in said zone, in order to be able to define a normal or perpendicular to said zone.

The term "glancing incidence" is understood to mean an incidence, whereof the angle is at least equal to approximately 85°, whilst the term "non-glancing incidence" means an incidence, whereof the angle is at the most equal to approximately 70°.

The particular polarization of the first radiation, called the "parallel polarization" and the fact that said first radiation reaches said zone common to both radiations under a glancing incidence means that the electric field corresponding to the first radiation is substantially perpendicular to said zone and that the first radiation consequently creates with said zone what is called a field coupling. The function of the latter is to lower the potential barrier "seen" by the conduction electrons contained in said zone.

The second radiation, transmitted simultaneously with the first, has the function of exciting by the photoelectric effect the said electrons, the extraction thereof thus taking place under increase quantum efficiency conditions.

Thus, the combination of the first and second radiations can make it possible to obtain a high density electron current, provided that the respective intensities of these radiations are sufficiently high and that said current be produced in the form of very short duration, high frequency pulses, so that the radiations are pulsed (which also makes it easier to obtain high intensities for the radiations) and the duration and frequency of the corresponding light pulses are appropriately chosen.

The invention can thus make it possible to obtain electron currents with a density at least equal to 100 $A.cm^{-2}$, in the form of pulse trains, whereof the repetition rate is in the range 1 MHz to 3 GHz and whereof the duration of each pulse is less than 1 nanosecond.

Moreover, due to the two physical effects combined in the present invention, the latter can make it possible to produce high density electron current without destroying or modifying the target, or polluting the environment thereof and this can take place for several hours, whereas in the aforementioned prior art methods this would lead to modifications, or would rapidly destroy the electron producing materials used on desiring to obtain with said methods electron currents of comparable densities.

It has already been stated that the first and second radiations can be pulsed. Preferably, the first radiation is pulsed at a frequency of 100 Hz to 1 kHz and the second radiation is pulsed at a frequency of approximately 1 Mhz to 3 GHz.

The electron current, whereof the time characteristics represent the convolution of the time characteristics of the two radiations is then produced in the form of elementary pulses with a high modulating frequency equal to the modulating frequency of the second radiation, said elementary pulses being grouped into trains, whose length and repitition rate are close to those of the first radiation.

The pulses of the electron current produced can thus have a very short duration (by e.g. choosing the duration of the pulses of the second radiation at most equal to approximatel 1 ns).

According to a preferred embodiment of the process according to the invention, the peak intensity of the pulses of the first radiation is approximately 1 $MW.cm^{-2}$ to 5 $GW.cm^{-2}$ and the peak intensity of the pulses of the second radiation is approximately 1 $kW.cm^{-2}$ to 1 $MW.cm^{-2}$.

A pulse-type electron current of very high density is then obtained.

The present invention also relates to an apparatus for the production of electrons, characterized in that it comprises a target made from a material which is not electrically insulating, a first means for producing a first radiation of the near or far infrared range, which is linearly polarized and which is supplied to the target and a second means for producing a second radiation of the visible or ultraviolet range and which is supplied to the target, the first and second means being arranged in such a way that the first and second radiations can reach a same zone of the target, the polarizing plane of the first radiation also being such that it contains a perpendicular to said zone, in such a way that said zone emits electrons when the first and second radiations are simultaneously supplied to the target.

According to a special embodiment of the apparatus according to the invention, the target is a thin film of said material deposited on a substrate transparent to the second radiation, whereby the first means supplies the first radiation to the free face of the thin film and the second means supplies the second radiation to the target through the substrate.

Preferably, the first and second means serve to produce pulsed radiations.

It is obviously possible to provide means for regulating the duration and frequency of the resulting light pulses, which makes it possible to obtain a pulse-type electron current, whereof the frequency and duration of the pulses are regulatable.

According to another special embodiment of the apparatus according to the invention, the first means comprises a first pulsed laser able to emit in the near or far infrared range and equipped with means for linearly polarizing the radiation which is able to emit.

Finally, according to another special embodiment, the second means comprises a second laser, which is continuous and has locked modes and which is successively followed by Q-switching means for the second laser, means for amplifying the intensity of a radiation from the Q-switching means and means for increasing the frequency of said radiation.

The invention is described in greater detail hereinafter relative to non-limitative embodiments and the attached drawings, wherein show:

FIG. 1 A diagrammatic partial view of an apparatus according to the invention.

Figure 2A:
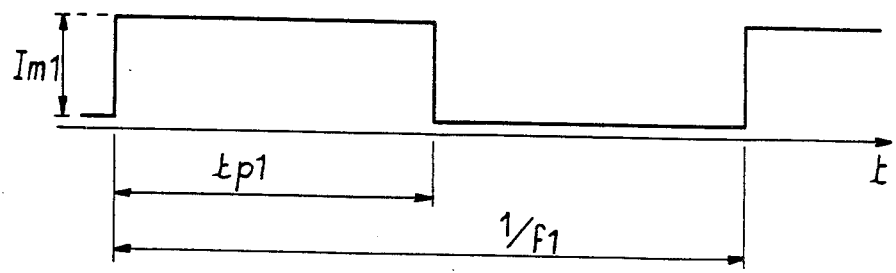

FIG. 2A Diagrammatically the light pulses of a first radiation used in said apparatus.

Figure 2B:
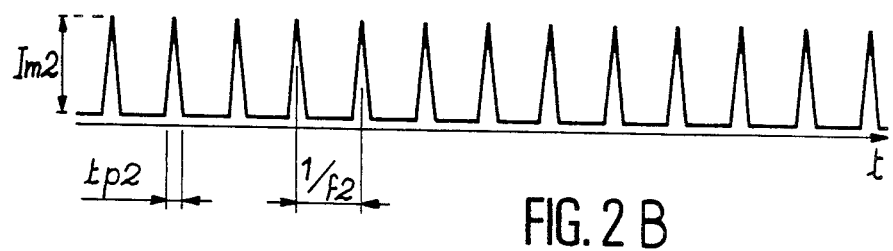

FIG. 2B Diagrammatically the light pulses of a second radiation also used in said apparatus.

Figure 2C:
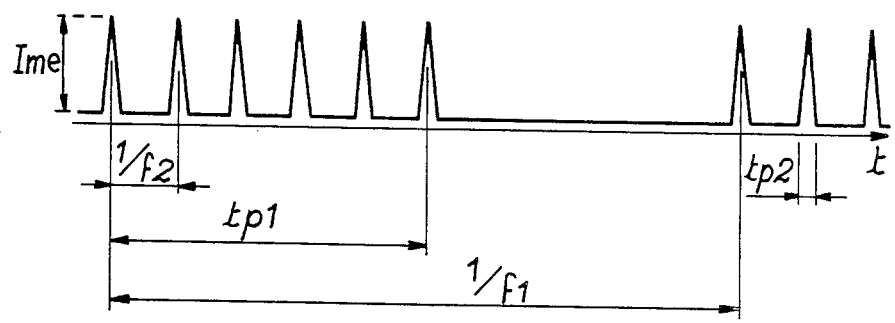

FIG. 2C Diagrammatically the pulses of the electron current which said apparatus can produce.

Figure 3:
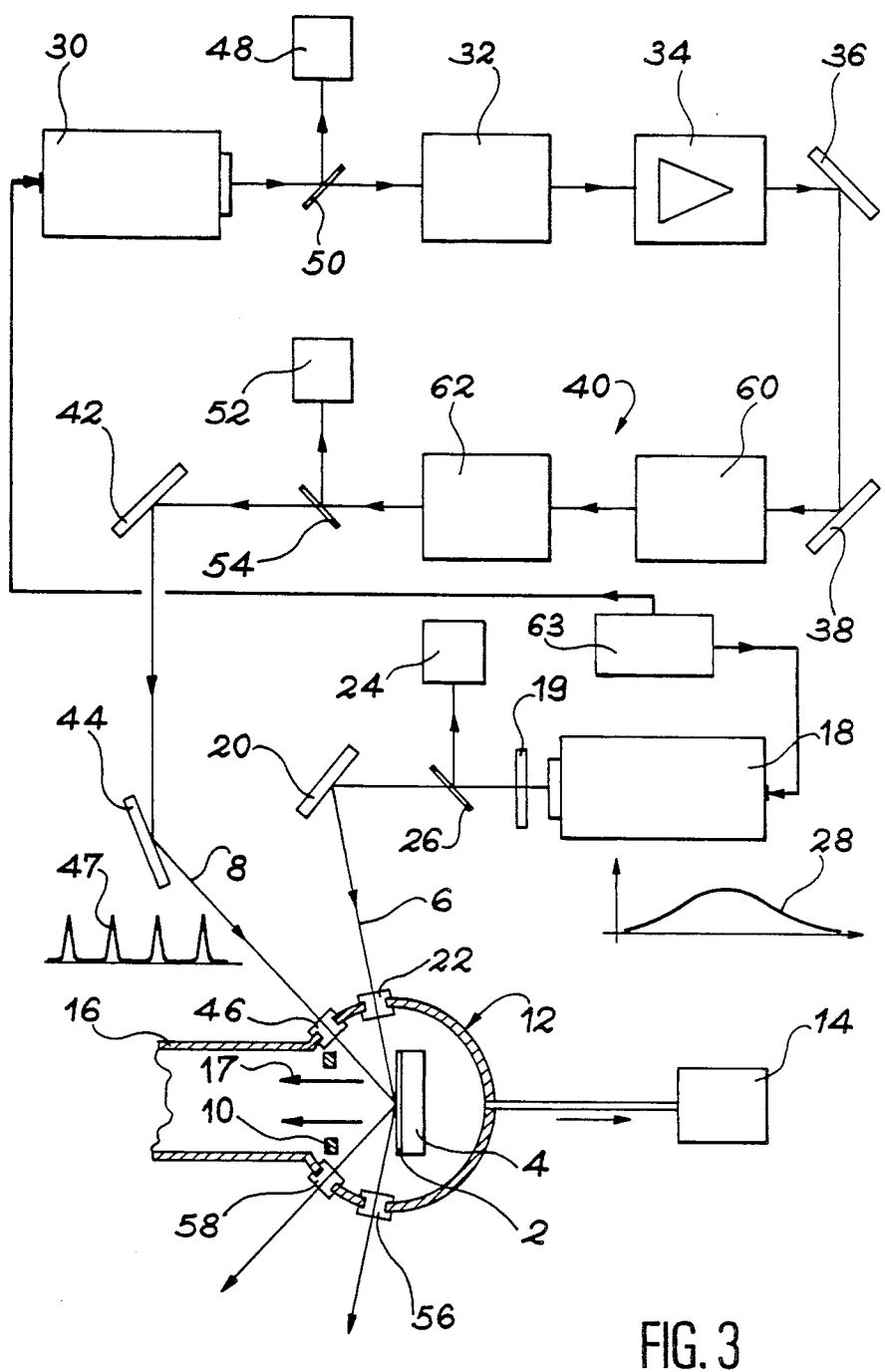

FIG. 3 A more detailed diagrammatic view of the apparatus of FIG. 1.

Figure 4:
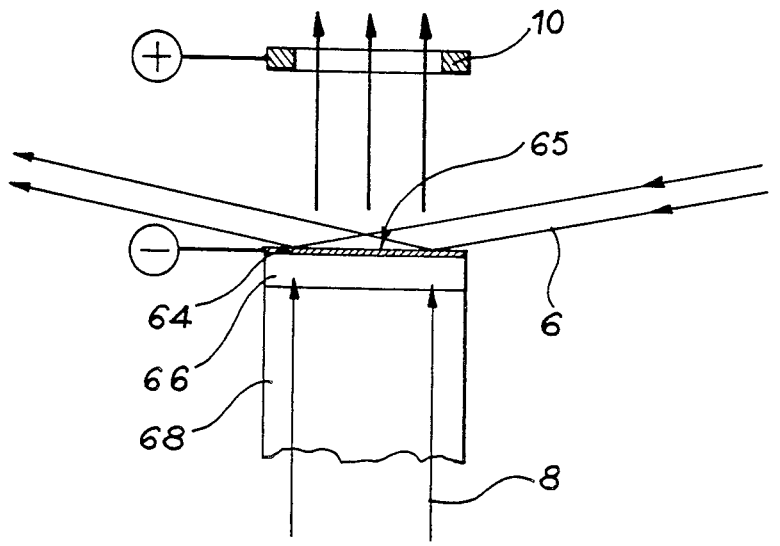

FIG. 4 Diagrammatically another embodiment of the apparatus according to the invention.

FIG. 1 diagrammatically and partly shows a embodiment of the apparatus according to the invention, which comprises a solid target 2, e.g. made from metal and which is mounted on a support 4 and whose surface is substantially planar.

Onto said target is supplied under a glancing incidence, a first infrared radiation 6 having a wavelength e.g. between 5 and 500 micrometers, pulsed to a frequency of approximately 100 Hz to 1 kHz. The peak intensity of the pulses of said first radiation preferably exceeds approximately 1 $MW.cm^{-2}$, so that said first radiation is sufficiently effective and which is below the intensity threshold beyond which the target would be damaged, whereby an intensity below 5 $GW.cm^{-2}$ would generally be suitable for this purpose. Furthermore, the duration of each pulse is approximately 10 to 100 microseconds.

The first radiation 6 is also linearly polarized in such a way that the polarizing plane contains a perpendicular to the surface of target 2. This, together with the glancing incidence, means that the first radiation creates a field coupling with the surface of the target. Thus, an intense electric field is produced substantially perpendicular to the target surface and said field makes it possible to lower the potential barrier "seen" by the conduction electrons of the target located in the vicinity of the surface of said target.

Simultaneously, onto said surface is supplied a second radiation 8 in the visible or ultraviolet range, the wavelength of said second radiation being equal to or below approximately 530 nanometers, in the form of a continuous train of short pulses, whose duration is at the most equal to approximately 1 nanosecond and whose repetition rate can be between approximately 1 MHz and 3 GHz. In addition, the peak intensity of each pulse of said second radiation preferably exceeds 1 $kW.cm^{-2}$ in order to have an appropriate efficiency and is below 1 $MW.cm^{-2}$ in order not to damage the target. Furthermore, said second radiation is supplied to the target in such a way that a same surface portion thereof is "illuminated" by both radiations. The second radiation is also supplied to target 2 under an angle of incidence at the most equal to approximately 70° and which is e.g. 45° or zero.

The second radiation makes it possible to extract by a photoelectric effect conduction electrons from the target at a time when the potential barrier "seen" by them on the target surface is lowered under the effect of the first radiation, i.e. under increased quantum efficiency conditions.

The electrons are produced in the form of current pulse trains, whereof the peak intensity can be approximately 200 to 300 $A.cm^{-2}$ and whereof the time characteristics are close to those of the second radiation. A modulation of the current pulse trains at a frequency of approximately 100 Hz to 1 kHz is also imposed by the first radiation. This is shown in FIGS. 2A to 2C.

In FIG. 2A it is possible to see the light pulses corresponding to the first infrared radiation 6. The peak intensity of these pulses is designated Im1, the duration of each of these pulses being designated tp1 and the frequency of the pulses is designated f1, t representing the time.

Thus, the pulses of the first radiation, represented in the form of square-wave pulses, do not strictly have this shape and are in fact more rounded (cf. FIG. 3).

FIG. 2B shows the pulses of the second radiation, whereof the peak intensity is designated Im2, the duration tp2 and the frequency f2. FIG. 2C shows the pulses of the electron current produced. They are pulse trains, whereof the duration is approximately tp1, the frequency of said pulse trains being approximately f1. Each pulse train is a periodic sequence of pulses, whereof the duration is approximately tp2 and the frequency approximately f2, the peak intensity of said pulses being designed Ime.

Returning to fig.1, target 2, which serves as a photocathode, is negatively polarized, by not shown electric polarizing means, with respect to an annular anode 10 adapted to the use of the electrons produced, the anode axis being perpendicular to the target surface and faces the latter.

The electric field resulting from said polarization makes it possible to move the electrons produced by the process according to the invention in a direction perpendicular to the target surface and in the direction passing from said target to the anode traversed by the electrons. This polarization is e.g. such that the resulting electric field is at the most equal to approximately 0.1 $MV.cm^{-1}$.

In a purely illustrative and non-limitative manner, the "active" part of the target surface reached by both radiations has a surface area of approximately 1 $cm^2$, or more if necessary.

FIG. 3 diagrammatically shows in greater detail the apparatus of FIG. 1. The latter comprises an enclosure 12 provided with means 14 making it possible to produce therein an ultra-high vacuum (i.e. a pressure below $10^{-7}$ Pa and e.g. approximately $5.10^{-8}$ Pa) and, within said enclosure, target 2 on its support 4 and anode 10. Enclosure 12 is e.g. extended by a duct 16, in which can circulate the electron beam 17 formed. Not shown electronic optical means can be provided in duct 16 for the processing of said electron beam (focussings, accelerations, deviations, etc.). Duct 16 could be an element of an electron injector for a particle accelerator.

The apparatus shown in FIG. 3 also comprises a laser 18 able to emit in the infrared range and controlled so as to emit a first pulsed radiation.

This radiation is linearly polarized by appropriate means 19 and is then deflected by an appropriate mirror 20, which supplies same under a glancing incidence of e.g. 85° to target 2 through a shielding window 22, which is transparent to infrared radiation and which is located on the wall of enclosure 12.

FIG. 3 also shows conventional means 24 for measuring the beam produced by laser 18, a small part of the latter being supplied in the direction of means 24 through a semi-reflecting plate 26 positioned, following means 19, on the trajectory of the beam from laser 18. Laser 18, means 19, plate 26 and mirror 20 are arranged in such a way that the polarizing plane of the incident radiation 6 on target 2 contains a perpendicular to the surface of said target. FIG. 3 also shows one 28 of the light pulses which laser 18 can emit.

The apparatus shown in FIG. 3 also comprises a second continuous laser 30 with locked modes followed by Q-switching means 32 for producing short duration laser pulse trains. Means 32 are followed by a laser amplifier 34 for amplifying the intensity of the radiation from means 32. The amplified radiation supplied by laser amplifier 34 is then supplied via appropriate mirrors 36, 38 to means 40 for doubling and/or tripling the optical frequency of the laser 30, in order to obtain said second radiation 8 (FIG. 1). The latter is then supplied via appropriate mirrors 42, 44 to target 2 with an angle of incidence of e.g. 45°, through a shielding window 46 which is transparent to said radiation and which is located on the wall of enclosure 12.

FIG. 3 also shows a few of the pulses 47 of the second radiation and it also shows the means 48 for measuring the beam from laser 30, which receive a small part thereof as a result of a semi-reflecting plate 50 placed on the trajectory of said beam, as well as other means 52 for measuring the beam from means 40, part of said beam being supplied in the direction of means 52 by means of a semi-reflecting plate 54 placed at the outlet from means 40.

Other shielding windows 56, 58 are also provided on the wall of enclosure 12 and are respectively traversed by the first and second radiations following the reflection thereof on the target 2, in order to carry out measurements thereon, if necessary.

In a purely indicative and non-limitative manner, laser 18 is a polarized, pulsed, $CO_2$ laser supplying a pulsed radiation with a wavelength of 10.6 micrometers, whereof the pulses have a peak intensity of 1 $MW.cm^{-2}$, a duration of approximately 10 microseconds and a frequency between 100 Hz and 1 kHz, the diameter of the beam from said laser being approximately 7 millimeters. Laser 30 is a continuous, locked mode, Nd:YAG laser supplying a radiation with a wavelength of 1.06 micrometer. The Q-switching means 32 are constituted by a Pockels cell ensuring that the duration of the pulse trains is between 10 and 100 microseconds. The laser amplifier 34 amplifies the radiation from the Q-switching means in such a way that the maximum amplitude of the corresponding pulses is approximately 50 $kW.cm^{-2}$. Conversion means 40 are constituted by a means 60 making it possible to double the initial radiation frequency, so as to supply a radiation with a wavelength of approximately 0.53. Means 60 are followed by a mixing means 62 able to supply radiation three times greater than the frequency of the radiation from laser 30, the wavelength of the second radiation 8 supplied to the target consequently being approximately 0.355 micrometer. The pulse of said second radiation have a duration of 200 picoseconds and a repetition of approximately 100 MHz.

Obviously, the apparatus shown in FIG. 3 comprises known means 63 for controlling the simultaneous operation of the two lasers 18 and 30.

FIG. 4 diagrammatically and partly illustrates another apparatus according to the invention, where use is made of a target constituted by a thin film 64 formed on one face of a substrate 66, which is transparent to the second radiation. The latter can be supplied to the thin film 64 through substrate 66, via an appropriate light guide 68, whereof one end faces the other face of substrate 66. The first radiation 6 is supplied under a glancing incidence to the free surface 65 of thin film 64. Thin film 64 is negatively electrically polarized with respect to the anode 10, whose axis is perpendicular to the free surface of film 64 (assumed to be substantially planar) and which faces the same.

In a purely illustrative and non-limitative manner, it is either possible to use a solid target made from a metal such as tungsten, or a cesium antimonide target (FIG. 1), or a target in the form of a thin gold film deposited on a melted silica or quartz substrate (FIG. 4) and, for a second radiation in the visible range, the light guide 68 is constituted by a bundle of optical fibres, whereas for a second radiation in the ultraviolet range said light guide in either a hollow metal tube, or a bundle of quartz optical fibres.

In general terms, the target material can be chosen in the group including tungsten, cesium antimonide, aluminium, zinc, copper, silver, gold, hafnium and uranium, the two latter have relatively low photoelectric operating functions. All these materials can be used in thin film form.

It should be noted that the apparatus according to FIG. 3 can be easily adapted to the realization of FIG. 4 by providing on enclosure 12 a tight passage for the light guide 68.

We claim:

1. Process for the production of electrons, characterized in that it comprises supplying under a glancing incidence of a first radiation (6) of the near or far infrared range which is linearly polarized to a target (2, 64) made from not electrically insulating material and simultaneously supplying to said target under a non-glancing incidence a second radiation (8) of the visible or ultraviolet range, in such a way that the same zone of the target is reached by the first and second radiations, the polarizing plane of the first radiation also being such that it contains a perpendicular to said zone, said zone then producing electrons.

2. Process according to claim 1, characterized in that the first and second radiations are also pulsed.

3. Process according to claim 2, characterized in that the first radiation is pulsed at a frequency of approximately 100 Hz to 1 kHz and in that the second radiation is pulsed at a frequency of approximately 1 MHz to 3 GHz.

4. Process according to claim 2, characterized in that the duration of the pulses of the second radiation is at the most equal to approximately 1 ns.

5. Process according to claim 2, characterized in that the maximum intensity of the pulses of the first radiation is approximately 1 MW.cm$^{-2}$ to 5 GW.cm$^{-2}$ and that the maximum intensity of the pulse of the second radiation is approximately 1 kW.cm$^{-2}$ to 1 MW.cm$^{-2}$.

6. An apparatus for the production of electrons, characterized in that it comprises a target (2, 64) made from a material which is not electrically insulating, a first means (18, 19) for producing a first radiation of the near or far infrared range, which is linearly polarized and which is supplied to the target and a second means (30, 32, 34, 40) for producing a second radiation of the visible or ultraviolet range and which is supplied to the target, the first and second means being arranged in such a way that the first and second radiations can reach a same zone of the target, the polarizing plane of the first radiation also being such that it contains a perpendicular to said zone, in such a way that said zone emits electrons when the first and second radiations (8) are simultaneously supplied to the target.

7. Apparatus according to claim 6, characterized in that the target is a thin film (64) of said material, deposited on a substrate (66) transparent to the second radiation (8), the first means is provided for supplying the first radiation (6) to the free face (65) of the thin film and the second means is provided for supplying the second radiation to the target through the substrate.

8. Apparatus according to claim 6, characterized in that the first (18, 19) and second (30, 32, 34, 40) means are provided for producing pulsed radiations.

9. Apparatus according to claim 8, characterized in that the first means comprises a first laser (18) which is pulsed and able to emit in the near or far infrared range and which is provided with means (19) for linearly polarizing the radiation which it is able to emit.

10. Apparatus according to claim 9, characterized in that the second means comprises a second laser (30), which is continuous and in locked mode form and which is successively followed by Q-switching means (32) for the second laser, means (34) for amplifying the intensity of the radiation from the Q-switching means and means (40) for increasing the frequency of said radiation.

11. Apparatus according to claim 6, characterized in that the target material is chosen from the group including tungsten, cesium antimonide, aluminium, zinc, copper, gold, silver, hafnium and uranium.

* * * * *

UNITED STATES PATENT AND TRADEMARK OFFICE
CERTIFICATE OF CORRECTION

PATENT NO. : 4,845,365

DATED : July 4, 1989

INVENTOR(S) : Jean-Peirre Girardeau-Montatu et al.

It is certified that error appears in the above-identified patent and that said Letters Patent is hereby corrected as shown below:

Col. 1, line 26, delete "of" (first occurrence).

Col. 1, line 28, insert --a-- after "from".

Col. 1, line 31, delete "the" and substitute therefor --a--.

Col. 1, line 36, delete "electrically non-insulating" and substitute therefor --not electrically insulating--.

Col. 1, lines 67-68, bad break on "photoe-lectric".

Col. 2, line 1, delete "increase" and substitute therefor --increased--.

Col. 2, line 7, insert --can-- before "be".

Col. 2, line 19, delete "current" and substitute therefor --currents--.

Col. 2, line 38, delete "repitition" and substitute --repetition--.

Col. 2, line 43, delete "approximatel" and substitute therefor --approximately--.

Col. 2, line 57, delete "which is supplied" and substitute therefor --for supplying said first radiation--.

UNITED STATES PATENT AND TRADEMARK OFFICE
CERTIFICATE OF CORRECTION

PATENT NO. : 4,845,365

DATED : July 4, 1989

INVENTOR(S) : Jean-Peirre Girardeau-Montatu et al

It is certified that error appears in the above-identified patent and that said Letters Patent is hereby corrected as shown below:

Col. 2, line 59, delete "which is supplied" and substitute therefor --for supplying said second radiation--.

Col. 3, line 1, insert --,-- after "material".

Signed and Sealed this

Seventeenth Day of April, 1990

Attest:

HARRY F. MANBECK, JR.

*Attesting Officer*  *Commissioner of Patents and Trademarks*